United States Patent [19]

Chern

[11] Patent Number: 4,486,515

[45] Date of Patent: Dec. 4, 1984

[54] STORAGE BATTERY ELECTROLYTE LEAK AND OVER-REPLENISHMENT PREVENTING DEVICE

[76] Inventor: Jen-Tsair Chern, 1, Shan Tzu Ting, Chia I City, Taiwan, 600

[21] Appl. No.: 566,974

[22] Filed: Dec. 30, 1983

[51] Int. Cl.³ .................... H01M 2/12; H01M 2/36
[52] U.S. Cl. ........................... 429/72; 429/84; 429/91; 429/175
[58] Field of Search .............. 429/72, 74, 84, 88, 429/91, 175

[56] References Cited

U.S. PATENT DOCUMENTS

| | | | |
|---|---|---|---|
| 1,605,820 | 11/1926 | Edwards | 429/84 |
| 3,179,539 | 4/1965 | Lozeau | 429/84 |
| 3,534,785 | 10/1970 | Bensen | 429/72 X |
| 4,009,322 | 2/1977 | Wolf | 429/175 |
| 4,252,870 | 2/1981 | Nemeth | 429/84 |
| 4,348,466 | 9/1982 | Elehew et al. | 429/84 |

Primary Examiner—Anthony Skapars
Attorney, Agent, or Firm—Armstrong, Nikaido, Marmelstein & Kubovcik

[57] ABSTRACT

This invention relates a new storage battery electrolyte leak and over-replenishment preventing device characterized by composing a cover with new leak-proof plates, liquid storage troughs, U conduits and a ledge for filling holes and lowering the ledge to the place very close to the level limit line on the case so as to achieve a perfect leak and over-replenishment preventing device.

7 Claims, 12 Drawing Figures

STORAGE BATTERY ELECTROLYTE LEAK AND OVER-REPLENISHMENT PREVENTING DEVICE

BACKGROUND AND SUMMARY OF THE INVENTION

Storage batteries are more economic and higher in current capacity than other batteries and are widely used for automobiles, autobicycles, ships, lighting systems and others for many years. Yet the conventional storage batteries still have many disadvantages which have not been overcome and have brought a lot of trouble and loss to the users. These disadvantages are:

A. Conventional lead-acid storage batteries—The electrolyte will spill over and cause damage to the user and other things if the batteries are carelessly tipped or reversed or over replenished.

B. Storage batteries with pastelike electrolyte (or sealed storage batteries)—The pastelike electrolyte of sodium silicate and diluted sulphuric acid is filled in the storage batteries and sealed at the factory. If the batteries are stored in the warehouse or shop for a long time, the electrolyte will dry up and the surface of the lead plate will become hardened and aged. This will seriously affect the life of the batteries. Furthermore, this kind of storage batteries can not be changed and discharge in great currents because the pastelike electrolyte tends to evaporate and dry up. It is very uneconomical.

C. Storage batteries with specific air space—This kind of storage batteries has less current capacity than other kinds of storage batteries in the same volume. And because of their smaller capacity of electrolyte, they must be replenished more frequently. Moreover, the troublesome work of replenishing must be done carefully. The electrolyte will spill over and cause trouble if it is replenished too much.

From the above mentioned disadvantages, it is seen that the spillover and leakage is a major disadvantage of the conventional storage batteries, which is resulted from the imperfect structure and design as well as careless replenishment. In view of these disadvantages, the inventor who has engaged in production of storage batteries for more than thirty years was duty-bound to make years of research, test and improvement and attained this invention.

The main structure and principle of this invention are as follows:

1. The cover of storage battery is composed of leak-proof plates, storage troughs and U conduits.

2. Two U conduits are installed diagonally at the bottom of each trough in such way that when the battery lies on any side there will always be one conduit end with vent gap emerging from the liquid electrolyte for the air to escape and another conduit end open to the trough being above the surface of the liquid electrolyte to prevent the electrolyte from leaking.

3. The natural resistance of the U shape of the conduits and the pressure of air outside the storage battery is used to prevent the liquid electrolyte from leaking when the storage battery stands upside down. (In this case the electrolyte has not surrounded the electrodes and the chemical reactions stop and the air outside can not enter into the battery.)

4. Storage troughs and leak-proof plates are well designed to achieve that the water condensed from the vapor produced during the discharge process will be stored in the trough and flow back to the cell, and the small amount of electrolyte leaked through the U conduits when the storage battery is carelessly reversed or tipped will be trapped in the trough and flow back to the cell when the battery restores its normal position.

5. The ledge for filling holes are lowered to a place very close the level limit line (electrolyte level limit indicator) to prevent over-replenishment and achieve a storage battery with perfect leak-proof device.

DETAILED DESCRIPTION

Figure 1:
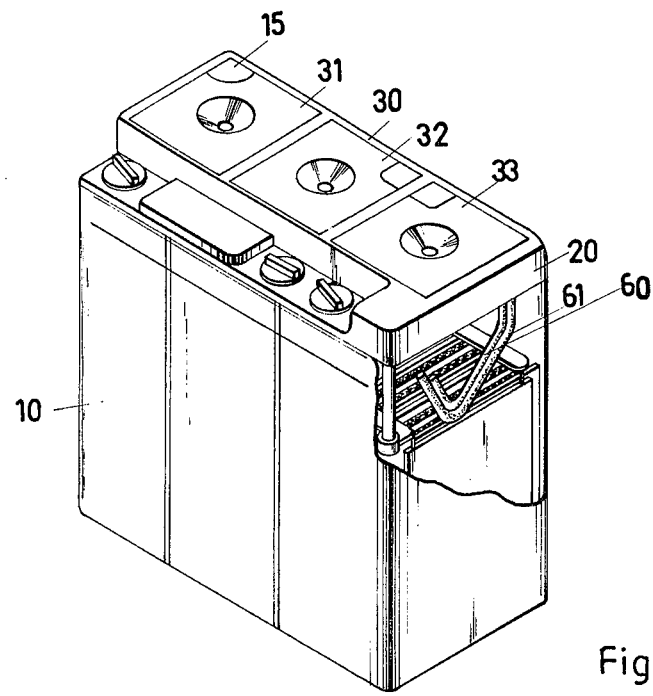
FIG. 1 is a vertical view of the lead preventing device of this invention in its initial stage with a section showing two special U conduits.

The main purpose of this invention is to improve the basic design of storage batteries and use U conduits, storage troughs and leak-proof plates to completely eliminate the causes of spill and leak of storage batteries.

Another purpose of this invention is to lower the filling holes to a place very close to the top edge of the case of the storage battery (to the line indicating the highest level of electrolyte with the filling holes) just on the level limit, the replenisher who is focusing on the filling hole and the level limit will be quickly aware that no more liquid should be filled when it reaches the limit line or it will reach the hole and spill, and he will stop filling immediately. In combination with the main purpose, this makes the storage battery not only completely free from leak but larger in capacity. The storage battery with electrolyte leak and over-replenishment preventing device of this invention needs fewer replenishments and is more convenient than the conventional storage battery.

Referring now to the drawings, the nature of this invention is described as follows:

As shown in FIG. 1, the top cover 20 on the case 10 has separate leak-proof plates 31, 32 and 33 and connected to the bottom of the storage trough (not shown) are two conduits 60 and 61 in different length of which the longer conduit 61 is a vent tube and the shorter one 60 a return liquid tube. With U shape and the air pressure in the conduits, the electrolyte will not spill when the storage battery stands upside down or lies on one side. This is the initial design of the invention which is very effective in preventing leak and spill. But when the chemical reaction occurs as the battery stands upside down or lies on one side and the vent hole is submerged by the electrolyte, the air produced will expel the liquid into the storage trough and some of it will spill out. It can not prevent leak and spill completely. So the inventor tried to make improvements.

Figure 2:
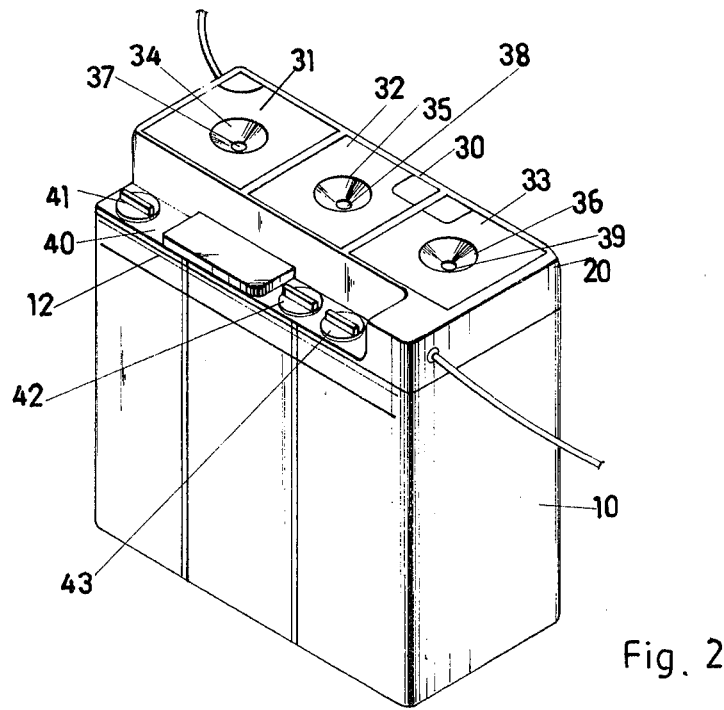
FIG. 2 is vertical view of the completed leak and over-replenishment preventing device of this invention showing with FIG. 1 the liquid level limit and the position of filling holes.

The improved device of this invention is shown in FIG. 2. Like the device shown in FIG. 1, the upper cover 30 of the cover 20 is formed in three leak-proof plates 31, 32 and 33 which have conical recesses 34, 35 and 36 respectively. The conical recesses have vent holes 37, 38 and 39 at their tops. The cover 20 has a ledge 40 which provides a surface for the filling hole screw plugs 41, 42 and 43. The ledge 40 is formed as low as at the bottom edge of the cover 20 and it is well designed to have the limit line 12 of electrolyte level situated at the top edge of the case 10. Thus the filling holes 41, 42 and 43 are just on the level limit line after the cover 20 is installed on the case 10. Over-replenishment will spill over the filling hole and the replenisher will instinctively stop replenishing when he sees the spill.

Figure 3:
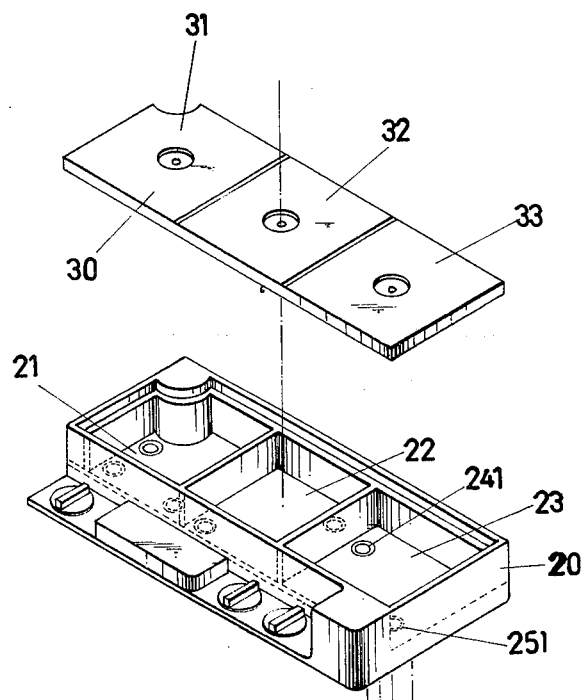
FIG. 3 is a perspective view of the base of the battery cover illustrating the connection of U conduits.
Figure 5:
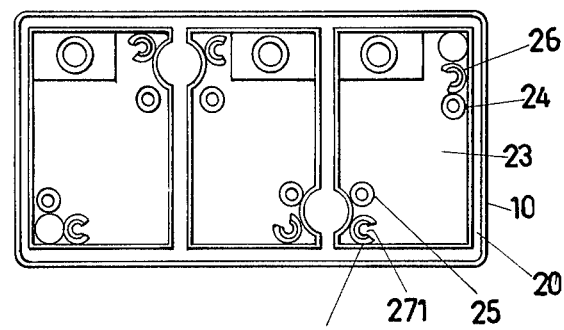
FIG. 5 is an elevation of the reverse of the battery cover showing its construction.
Figure 6A:
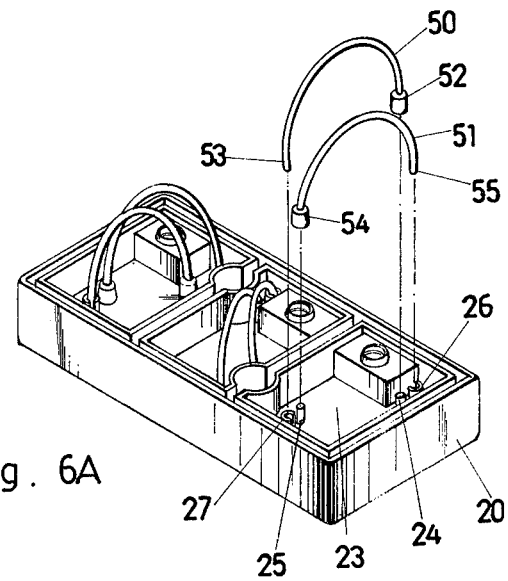
FIGS. 6A, 6B and 6C illustrate partial connection of conduits with the base cover.

FIG. 3 shows that the upper part 30 of the cover 20 has three integrated leak-proof plates for sealing the storage troughs 21, 22 and 23 respectively and each of the troughs 23, for example, has two U conduits 50 and 51 connected to its bottom. The connection and installation of these U conduits is described below by referring to FIGS. 5 and 6.

Figure 6B:
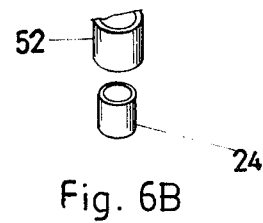
Figure 6C:
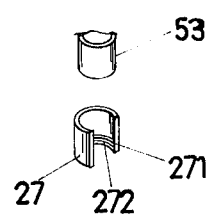

The trough 23 has two pairs of protrudent tubes 24 and 26, 25 and 27 in two opposite corners on its back. One end 52 of the U conduit 50 is fitted tightly over the protrudent tube 24 as shown in FIG. 6B and the other end 53 is fitted in the protrudent tube 27 as shown in FIG. 6C. The protrudent tube 27 has a slot 271 and an internal flange 272 and a gap will be formed after the conduit end 53 is fitted in the protrudent tube 27 with its perimeter against the flange 27. The ends 54 and 55 of the other conduit 51 are connected to the protrudent tubes 25 and 26 in the same way. The feature of this installation is that as the storage battery lies on one side, either two connections of the protrudent tubes 24 and 26, or 25 and 27 with the conduits 50 and 51 will always emerge from the liquid electrolyte and the gap formed by the slotted tube 27 or 26 with the conduit ends 53 or 55 will serve as a vent for the air produced in the chemical reaction to escape without expelling the liquid out of the battery. The disadvantage of the initial design as shown in FIG. 1 is thus eliminated. Additionally, the natural resistance of the U shape of the conduits and the pressure of air in the U conduits from the trough through the protrudent tubes 24 and 25 will further keep the liquid from entering the conduits. Accordingly, the device of this invention can prevent the electrolyte from spilling.

Figure 4:
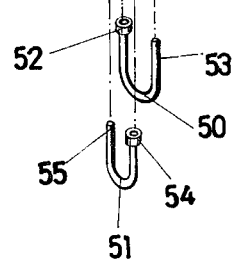
FIG. 4 is a vertical view of the reverse of the upper part of the battery cover illustrating its construction.
Figure 4:
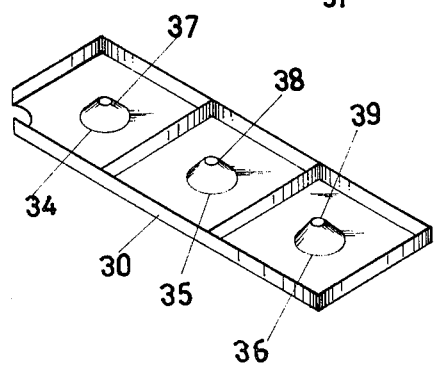

Referring back to FIG. 3 for the construction of the trough 23 and upper cover 30, two vent holes 241 and 251 are provided in the bottom of each trough 23 for the protrudent tubes 24 and 25. The trough 23 itself is designed to receive and store the small amount of liquid spilled in case of abnormity. The spillover stored will flow back to the cells through the vent holes 241 and 251 after the abnormity disappears. Since abnormal state is assumed to occur, the upper cover 30 is made in three leak-proof plates 31, 32 and 33 respectively for the troughs 21, 22 and 23, and in the center of the plates 31, 32 and 33 are provided three conical recesses 34, 35 and 36 which project from the reverse of the plates as shown in FIG. 4. Besides, vent holes 37, 38 and 39 are provided in the top of the conical recesses 34, 35 and 36 for the air escaped through the vent holes 241 and 251 to escape. The conical recesses 34, 35 and 36 project deep in the troughs so that any small amount of electrolyte stored in the troughs will not spill through the conical top holes 37, 38 and 39 when the storage battery is reversed. This auxiliary device helps prevent spill and forms a perfect leak preventing device with the said U conduits 50 and 51.

Figure 7:
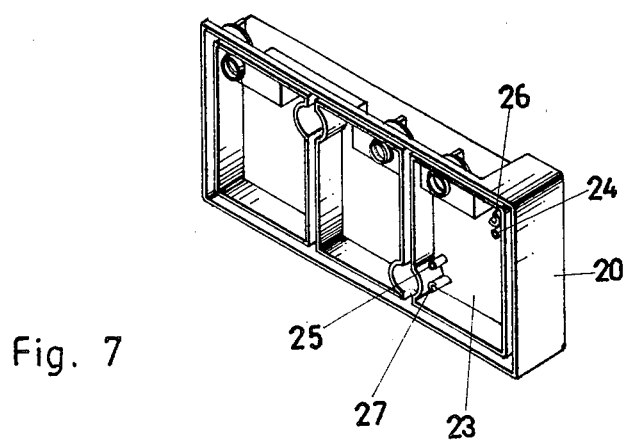
FIG. 7 shows the position of the four protrudent tubes on the base cover when the battery lies on the rear side.
Figure 8:
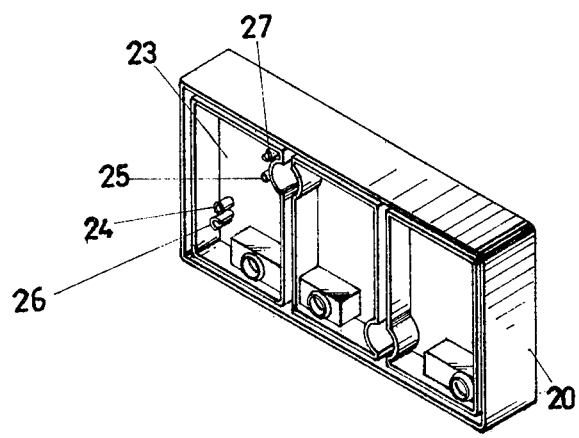
FIG. 8 shows the position of the four protrudent tubes on the base cover when the battery lies on the front side.
Figure 9:
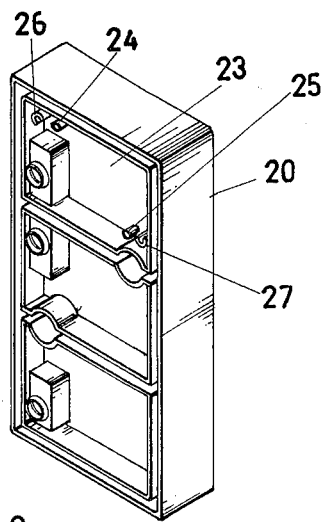
FIG. 9 shows the position of the four protrudent tubes on the base cover when the battery lies on the left side.
Figure 10:
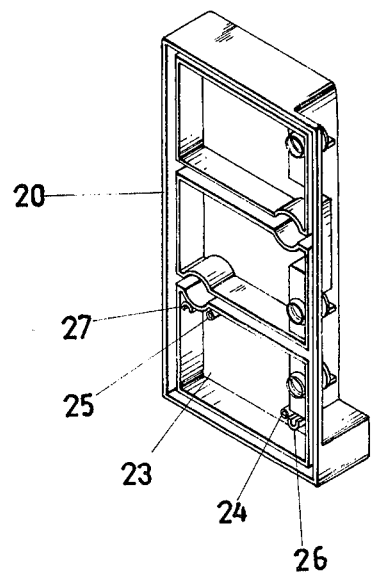
FIG. 10 shows the position of the four protrudent tubes on the base cover when the battery lies on the right side.

FIGS. 7–10 further illustrate the joint function of the four protrudent tubes 24, 26, 25 and 27 and the U conduits 50 and 51 when the storage battery lies respectively on the rear side, on the front side, on the left side and on the right side. FIG. 7 shows the state when the battery lies on the rear side. In this case, the protrudent tubes 25 and 27 are submerged by the electrolyte but the protrudent tubes 24 and 26 emerge. The slotted tube 26 is in the topmost position and the gap (272 shown in FIG. 6C) formed after the end of the U conduit (not shown here but in FIG. 6) is fitted in the protrudent tube 26 will serve as a vent hole for the air produced in the chemical reaction to escape without expelling the liquid electrolyte out of the battery. Similarly, when the storage battery lies on the front side as shown in FIG. 8, the protrudent tubes 25 and 27 will emerge and the slotted tube 27 will serve as a vent hole. When the storage battery lies on the left side as shown in FIG. 9, the protrudent tubes 26 and 24 will emerge and the slotted tube 26 will serve as a vent hole. When the battery lies on the right side as shown in FIG. 10, the protrudent tubes 25 and 27 will emerge and the slotted tube 27 will serve as a vent hole. With the U conduits diagonally installed on the protrudent tubes in opposite corners of each trough, there are always two protrudent tubes or ends of the two U conduits emerging when the battery lies on any side. This not only provides vent holes for air to escape freely but also has good leak-proof efficiency.

In addition to the prevention of improper replenishment by changing the basic design of the position of filling holes, this invention completely solve the problem of electrolyte leak and spill by providing the U conduits and the auxiliary device of the troughs and leak-proof plates. The storage battery electrolyte leak and over-replenishment preventing device of this invention is really a perfect device.

I claim:

1. A new storage battery electrolyte leak and over-replenishment preventing device characterized by comprising:
    a base cover with a ledge providing a mounting surface for filling holes very close to the case joint, and separate troughs corresponding to the cells located behind the ledge, sealed with the upper cover, and having four protrudent tubes in two opposite corners on the reverse of each trough;
    an upper cover made in three integrated leak-proof plates for sealing the three troughs, having conical recesses in the center of the plates, and having vent holes at the top of the conical recesses;
    U conduits, two each installed diagonally on the four protrudent tubes of each trough.

2. A new device according to claim 1 wherein the filling holes in the ledge are very close to the level limit (the line indicating the highest liquid level) on the case after the cover is mounted on the case.

3. A new device according to claim 1 wherein one of each pair of protrudent tubes on the reverse of the trough is unslotted and open to the trough and the other is slotted and internal flanged but not open to the trough.

4. A new device according to claim 3 wherein the U conduits are diagonally connected to the four protrudent tubes on the reverse of each trough in such way that one end of the U conduit is tightly fitted over the unslotted protrudent tube and the other end is fitted in the slotted and internal flanged protrudent tube to form a vent gap.

5. A new device according to claim 4 wherein the diagonal connection of U conduits with four protrudent tubes is made in such way that one of the vent gaps in opposite corners will always emerge when the storage battery lies on one side so as to serve as a vent hole for the air from the cell to escape.

6. A new device according to claim 1 wherein the conical recess at the center of each leak-proof plate of the upper cover protrudes deep in the trough so that the small amount of liquid electrolyte stored in the trough will not spill when the storage battery stands upside down or lies on one side.

7. A new device according to claim 1 wherein the gap formed after the U conduit is fitted in the slotted tube becomes an air vent together with the opening of the unslotted tube opening and the hole in the top of the conical recess.

* * * * *